(12) United States Patent
Venkataraman et al.

(10) Patent No.: US 10,119,073 B2
(45) Date of Patent: Nov. 6, 2018

(54) METHOD OF PROCESSING QUANTUM DOT INKS

(71) Applicant: SAMSUNG ELECTRONICS CO., LTD., Suwon-si (KR)

(72) Inventors: Karthik Venkataraman, Arlington, MA (US); Abhishek Gupta, Cambridge, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 663 days.

(21) Appl. No.: 14/460,131

(22) Filed: Aug. 14, 2014

(65) Prior Publication Data

US 2015/0041714 A1 Feb. 12, 2015

Related U.S. Application Data

(63) Continuation of application No. PCT/US2013/025235, filed on Feb. 7, 2013.

(60) Provisional application No. 61/599,216, filed on Feb. 15, 2012.

(51) Int. Cl.
| | |
|---|---|
| *C09K 11/02* | (2006.01) |
| *C09K 11/88* | (2006.01) |
| *B82Y 20/00* | (2011.01) |
| *B82Y 30/00* | (2011.01) |
| *G02F 1/017* | (2006.01) |

(52) U.S. Cl.
CPC ............ *C09K 11/883* (2013.01); *B82Y 20/00* (2013.01); *B82Y 30/00* (2013.01); *G02F 2001/01791* (2013.01)

(58) Field of Classification Search
CPC .................................................... C09K 11/025
See application file for complete search history.

(56) References Cited

U.S. PATENT DOCUMENTS

| | | | |
|---|---|---|---|
| 4,260,398 A * | 4/1981 | Ransohoff .......... | B01D 19/0057 95/245 |
| 2010/0110728 A1* | 5/2010 | Dubrow ............... | C09K 11/025 362/615 |
| 2010/0123155 A1 | 5/2010 | Pickett et al. | |
| 2010/0155749 A1 | 6/2010 | Chen et al. | |
| 2011/0140075 A1 | 6/2011 | Zhou et al. | |
| 2011/0241229 A1 | 10/2011 | Naasani et al. | |
| 2013/0037778 A1* | 2/2013 | Kazlas ................... | B82Y 10/00 257/9 |

FOREIGN PATENT DOCUMENTS

WO     2011060180 A1    5/2011

OTHER PUBLICATIONS

Dolan. How much is enough? LGCG North America vol. 21 No. 10, pp. 968 and 968 and 970-972. Oct. 2003 (Year: 2003).*
Office Action of TW Application No. 102105417 dated May 18, 2017 with English Summary (10 pages).

* cited by examiner

*Primary Examiner* — Matthew E. Hoban
(74) *Attorney, Agent, or Firm* — Cantor Colburn LLP

(57) ABSTRACT

A method of storing and transporting quantum dot formulations is provided. The method includes storing and/or transporting the quantum dot formulation under an oxygen-containing atmosphere. A sparged and degassed quantum dot formulation is also described.

13 Claims, 3 Drawing Sheets

METHOD OF PROCESSING QUANTUM DOT INKS

This application is a continuation of International Application No. PCT/US2013/025235, filed 7 Feb. 2013, which was published in the English language as International Publication No. WO 2013/122820 on 22 Aug. 2013, which International Application claims priority to U.S. Provisional Patent Application No. 61/599,216, filed on 15 Feb. 2012. Each of the foregoing is hereby incorporated herein by reference in its entirety for all purposes.

TECHNICAL FIELD OF THE INVENTION

The present invention relates to the technical field of quantum dots, including methods, and compositions and products including quantum dots.

BRIEF SUMMARY OF THE INVENTION

Embodiments of the present disclosure are directed to quantum dot formulations, containers including quantum dot formulations, and related methods, including methods relating to the storage and/or transport of such quantum dot formulations. Embodiments of the present disclosure are also directed to the processing of quantum dot formulations that have been stored or transported for a period of time.

Quantum dots may perform less efficient under operating conditions of heat and light flux if in an environment that includes oxygen. Accordingly, quantum dots should be maintained in a substantially oxygen-free environment. According to aspects of the present disclosure, a quantum dot formulation can be stored or transported under an oxygen environment, and then the oxygen can be removed before the formulation is placed into the vessel or tube or container, without loss in efficiency or reliability.

According to one aspect, oxygen is included into a quantum dot formulation. According to one aspect, an effective amount of oxygen is included into a quantum dot formulation. According to an additional aspect, oxygen is included into a quantum dot formulation by passing oxygen over a surface of the quantum dot formulation. According to yet an additional aspect, oxygen is included into a quantum dot formulation by passing oxygen through the quantum dot formulation, such as by injecting oxygen into or bubbling oxygen through the quantum dot formulation. According to an additional aspect, oxygen is included into a quantum dot formulation by mixing oxygen into the quantum dot formulation. According to an additional aspect, oxygen is included into a quantum dot formulation by placing the quantum dot formulation under an atmosphere that includes oxygen. According to one aspect, oxygen is included in the quantum dot formulation by diffusion. According to an additional aspect, the quantum dot formulation may be agitated or mixed or stirred such that oxygen in the oxygen containing atmosphere is included in the quantum dot formulation. According to one aspect, a quantum dot formulation is placed within a container under an atmosphere that includes oxygen.

According to one aspect, oxygen is included into a quantum dot formulation in an amount effective to inhibit polymerization of polymerizable species in the quantum dot formulation. According to one aspect, oxygen is included into a quantum dot formulation in an amount effective to scavenge free radicals. According to one aspect, oxygen is included into a quantum dot formulation in an amount effective to scavenge free radicals and to inhibit polymerization of polymerizable species in the quantum dot formulation through free radical polymerization. According to one aspect, oxygen is included into a quantum dot formulation in an amount effective to reduce the amount of free radicals within the quantum dot formulation.

According to one aspect, the quantum dot formulation includes an inhibitor compound or polymerization inhibitor compound which may also be referred to as an inhibitor. The inhibitor compound when in the presence of oxygen inhibits inadvertent or undesired polymerization of polymerizable species in the quantum dot formulation. The inhibitor compound when in the presence of oxygen inhibits, and preferably prevents, the polymerizable species in the quantum dot formulation from inadvertent or undesired polymerization. Accordingly, oxygen is included in the quantum dot formulation in an amount relative to the inhibitor compound. According to one aspect, oxygen is included in the quantum dot formulation in an amount effective to scavenge free radicals and react with the inhibitor compound thereby removing the free radical from the quantum dot formulation. According to one aspect, oxygen is supplemented to the quantum dot formulation over a period of time to provide an effective or sufficient amount of oxygen to scavenge free radicals from the quantum dot formulation and react with the inhibitor compound thereby removing free radicals from the quantum dot formulation.

Optionally, the quantum dot formulation may be placed under conditions of no light or low light or light of certain wavelength. In particular, these light conditions would not include wavelengths of light that activate any photoinitiators that may be included in the ink formulation. As the shelf life of the ink is shortened as the storage temperature is raised, elevated storage or transportation temperatures should be avoided. According to one aspect, the quantum dot formulation is placed into an opaque container which excludes or substantially excludes light from entering the container. According to one aspect, the quantum dot formulation is placed under conditions that exclude wavelengths of light, such as an opaque container or light filtering container, that activate photoinitiators that may be present in the quantum dot formulation. According to one aspect, the quantum dot formulation is placed under conditions absent of light having a wavelength of about 500 nm or less, such as about 450 nm or less. Optionally, the quantum dot formulation may be placed in an environment where the temperature is insufficient to polymerize polymerizable species in the quantum dot formulation. According to one aspect, the quantum dot formulation may be kept or maintained at a temperature of room temperature or less, such that polymerization does not occur. According to one aspect, the quantum dot formulation may be kept or maintained at a temperature of between about 4° C. and 25° C. According to one aspect, the quantum dot formulation may be kept or maintained at a temperature of room temperature or less. According to one aspect, the quantum dot formulation may be kept or maintained at a temperature of between about 4° C. and 15° C. According to one aspect, the quantum dot formulation may be kept or maintained at a temperature of room temperature or less. According to one aspect, the quantum dot formulation may be kept or maintained at a temperature of between about 20° C. and 25° C. Optionally, the quantum dot formulation may be placed in an environment where the temperature is less than about 23° C.

The quantum dot formulation including oxygen therein may be placed within a container, such as an opaque container, and remains within the container for a period of time until use of the quantum dot formulation is desired. The quantum dot formulation may be placed within a container, such as an opaque container under an atmosphere that includes oxygen and remains within the container for a period of time until use of the quantum dot formulation is desired. The quantum dot formulation including oxygen therein may be placed within a container, such as an opaque container, under an atmosphere that includes oxygen and remains within the container for a period of time until use of the quantum dot formulation is desired. Such a period of time includes a storage time. Such a period of time includes a shipping time. Accordingly, aspects of the present disclosure include methods of storing a quantum dot formulation including placing a quantum dot formulation including oxygen therein within a container, such as an opaque container, and storing the container for a period of time. Accordingly, aspects of the present disclosure include methods of storing a quantum dot formulation including placing a quantum dot formulation within a container, such as an opaque container, under an atmosphere that includes oxygen and storing the container for a period of time. Accordingly, aspects of the present disclosure include methods of storing a quantum dot formulation including placing a quantum dot formulation including oxygen therein within a container, such as an opaque container, under an atmosphere that includes oxygen and storing the container for a period of time.

Aspects of the present disclosure include methods of shipping a quantum dot formulation including placing a quantum dot formulation including oxygen therein within a container, such as an opaque container, and shipping the container from one location to another. Aspects of the present disclosure include methods of shipping a quantum dot formulation including placing a quantum dot formulation within a container, such as an opaque container, under an atmosphere that includes oxygen and shipping the container from one location to another. Aspects of the present disclosure include methods of shipping a quantum dot formulation including placing a quantum dot formulation including oxygen therein within a container, such as an opaque container, under an atmosphere that includes oxygen and shipping the container from one location to another. Methods of storing or shipping described herein may also include either storing or shipping the container of the quantum dot formulation under light conditions or temperatures described herein. Aspects of the present disclosure are further directed to a container, such as an opaque container, including a quantum dot formulation having oxygen therein. Aspects of the present disclosure are further directed to a container, such as an opaque container, including a quantum dot formulation under an atmosphere that includes oxygen. Aspects of the present disclosure are further directed to a container, such as an opaque container, including a quantum dot formulation having oxygen therein and under an atmosphere that includes oxygen.

Aspects of the present disclosure also include methods of processing quantum dot formulations including oxygen therein and/or that have been placed under an atmosphere that includes oxygen. According to one aspect, all or substantially all oxygen is removed from the quantum dot formulation such that that there is no or substantially no dissolved or entrapped oxygen in the quantum dot formulation. According to one aspect, all or substantially all gas is removed from the quantum dot formulation such that there is not dissolved or entrapped gas in the quantum dot formulation. According to one aspect, all or substantially all oxygen is removed from the quantum dot formulation when all or substantially all gas is removed from the quantum dot formulation. Accordingly, a method is provided for removing all or substantially all gas from a quantum dot formulation. Methods of removing all or substantially all gas from a liquid formulation are known to those of skill in the art. Such methods may be referred to as degassing.

According to one aspect, the quantum dot formulation is subjected to an inert gas such that oxygen is removed from the quantum dot formulation. According to one aspect, an inert gas is introduced into the quantum dot formulation, such as by spraying, bubbling, the gas through the quantum dot formulation. According to one aspect, the quantum dot formulation is sparged with an inert gas.

According to one aspect, the quantum dot formulation is degassed of oxygen by the inert gas. According to one aspect, the quantum dot formulation is sparged or inert gas is otherwise added to the quantum dot formulation to the extent sufficient to remove substantially all oxygen from the quantum dot formulation. According to an additional aspect, the quantum dot formulation is degassed to the extent sufficient to remove substantially all gas, whether oxygen or not, from the quantum dot formulation. Accordingly, aspects of the present disclosure are directed to a degassed quantum dot formulation. Accordingly, aspects of the present disclosure are directed to a sparged quantum dot formulation. Accordingly, aspects of the present disclosure are directed to a deoxygenated quantum dot formulation. Accordingly, aspects of the present disclosure are directed to a sparged and degassed quantum dot formulation. The sparged quantum dot formulation includes no or substantially no oxygen. The degassed quantum dot formulation includes no or substantially no gas. The degassed quantum dot formulation includes no or substantially no oxygen. The sparged and/or degassed quantum dot formulation may be maintained under an inert atmosphere or under vacuum prior to use.

According to one aspect, the sparged and/or degassed quantum dot formulation is used in devices known to those of skill in the art where light emission from quantum dots is desired. Such devices include remote downconversion optics such as those for solid state lighting, LCD display backlight units, solar energy devices and the like; on-chip applications such as LED downconversion to replace or enhance phosphor downconversion.

As an example, a sparged and/or degassed and/or deoxygenated quantum dot formulation which includes no or substantially no oxygen and/or no or substantially no gas can be used in the manufacture of an optical component or other material, such as a quantum dot film which is to be used with a device where light emission from quantum dots is desired. According to a certain aspect, the sparged and/or degassed quantum dot formulation is introduced into a vessel or tube or container to be used an optical component. According to one aspect, the sparged and/or degassed quantum dot formulation is introduced into the vessel or tube or container and the vessel or tube or container is then sealed. According to one aspect, the quantum dot formulation within the vessel or tube or container is under oxygen-free conditions such as a vacuum. Methods of introducing a quantum dot formulation into a vessel or tube or container are known to those of skill in the art and will be readily apparent based on the present disclosure. According to a certain aspect, the quantum dot formulation within the vessel or tube or container is then subjected to conditions to cure the quantum dot formulation into a matrix. An optical component including a polymerized quantum dot-containing formulation may then be used in various devices, including but not limited to those described herein.

According to one aspect, the sparged and/or degassed quantum dot formulation is used in the manufacture of a quantum dot film. According to a certain aspect, the sparged and/or degassed quantum dot formulation is introduced into a composition used to make quantum dot film. The composition is then subjected to processing conditions to manufacture a film with quantum dots therein. Methods of making quantum dot films are known to those of skill in the art and will be readily apparent based on the present disclosure.

According to one aspect, the quantum dot formulation may be a combination of certain quantum dots, such as quantum dots that emit green light wavelengths and quantum dots that emit red light wavelengths, and that are stimulated by an LED emitting blue light wavelengths resulting in the generation of trichromatic white light. According to one aspect, the quantum dots are contained within an optical component such as a tube or a film which receives light from an LED. Light generated by the quantum dots may be delivered via a light guide for use with display units. According to certain aspects, light generated by quantum dots, such as trichromatic white light, is used in combination with a liquid crystal display (LCD) unit or other optical display unit, such as a display back light unit. One implementation of the present invention is a combination of the quantum dots within a tube the contents of which may be under oxygen-free conditions, an LED blue light source and a light guide for use as a backlight unit which can be further used, for example, with an LCD unit.

Optical components that include quantum dots according to the present invention include vessels, tubes or containers of various configurations, such as length, width, wall thickness, and cross-sectional configuration. The term "tube" as used in the present disclosure includes a capillary, and the term "tube" and "capillary" are used interchangeably. Tubes of the present invention are generally considered light transmissive such that light can pass through the wall of the tube and contact the quantum dots contained therein thereby causing the quantum dots to emit light. According to certain aspects, tubes may be configured to avoid, resist or inhibit cracking due to stresses placed on the tube from polymerizing a matrix therein or heating the tube with the polymerized matrix therein. In this aspect, the tubes of the present invention are glass tubes for use with quantum dots. Such tubes can have configurations known to those of skill in the art. Such tubes may have a stress-resistant configuration and exhibit advantageous stress-resistant properties. The tube containing the quantum dots is also referred to herein as an optical component. An optical component can be included as part of a display device.

According to one aspect, the vessel, tube or container of the present disclose is made from a transparent material and has a hollow interior. Quantum dots reside within the tube and may be contained within a polymerized matrix material which is light transmissive. A polymerizable composition including quantum dots and at least monomers can be introduced into the tube such as under oxygen free conditions. The tube may be sealed to maintain the oxygen-free nature of the polymerizable composition. The polymerizable composition is then polymerized within the tube using light or heat, for example.

Accordingly, the present disclosure provides a tube including a sparged and/or degassed quantum dot formulation therein wherein the quantum dot formulation includes no or substantially no oxygen and/or no or substantially no gas. The present disclosure provides a tube including a sparged and/or degassed and polymerized quantum dot formulation therein. The present disclosure provides a combination including a glass tube having a sparged and/or degassed and polymerized quantum dot formulation therein; one or more light sources adjacent to the glass tube; and a light guide adjacent to the glass tube. The present disclosure provides a back light display unit including one or more light sources; a glass tube having a sparged and/or degassed and polymerized quantum dot formulation therein adjacent the one or more light sources; a light guide interconnecting the glass tube and a display. The present disclosure provides a method for making an optical component comprising introducing a sparged and/or degassed formulation including quantum dots into a glass tube and polymerizing the polymerizable formulation to form a matrix including quantum dots.

Embodiments of the present invention are directed to the mixtures or combinations or ratios of quantum dots that are used to achieve certain desired radiation output. Such quantum dots can emit red and green light of certain wavelength when exposed to a suitable stimulus. Still further embodiments are directed to various formulations including quantum dots which are used in various light emitting applications. Formulations including quantum dots may also be referred to herein as "quantum dot formulations" or "optical materials". For example, quantum dot formulations can take the form of flowable, polymerizable fluids, commonly known as quantum dot inks, that are introduced into the tube and then polymerized to form a quantum dot matrix. According to certain aspects, quantum dot formulations can take the form of flowable, polymerizable fluids, commonly known as quantum dot inks, that are introduced into the tube under oxygen-free conditions and then polymerized to form a quantum dot matrix. The tube is then used in combination with a light guide, for example.

Such formulations include quantum dots and a polymerizable composition such as a monomer or an oligomer or a polymer capable of further polymerizing. Additional components include at least one or more of a crosslinking agent, a scattering agent, a rheology modifier, a filler, a photoinitiator, and a polymerization inhibitor compound which may be referred to as an inhibitor and other components useful in producing a polymerizable matrix containing quantum dots. Polymerizable compositions of the present invention include those that avoid yellowing when in the form of a polymerized matrix containing quantum dots. Yellowing leads to a lowering of optical performance by absorbing light emitted by the quantum dots and light emitted by the LED which can lead to a shift in the color point.

Embodiments of the present invention are still further directed to various backlight unit designs including the quantum dot-containing tubes, LEDs, and light guides for the efficient transfer of the generated light to and through the light guide for use in liquid crystal displays. According to certain aspects, methods and devices are provided for the illumination and stimulation of quantum dots within tubes and the efficient coupling or directing of resultant radiation to and through a light guide.

Embodiments are further provided for a display including an optical component taught herein.

Embodiments are still further provided for a device (e.g., but not limited to, a light-emitting device) including an optical component taught herein.

Each of the claims set forth at the end of the present application are hereby incorporated into this Summary section by reference in its entirety.

The foregoing, and other aspects and embodiments described herein all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

Figure 1:
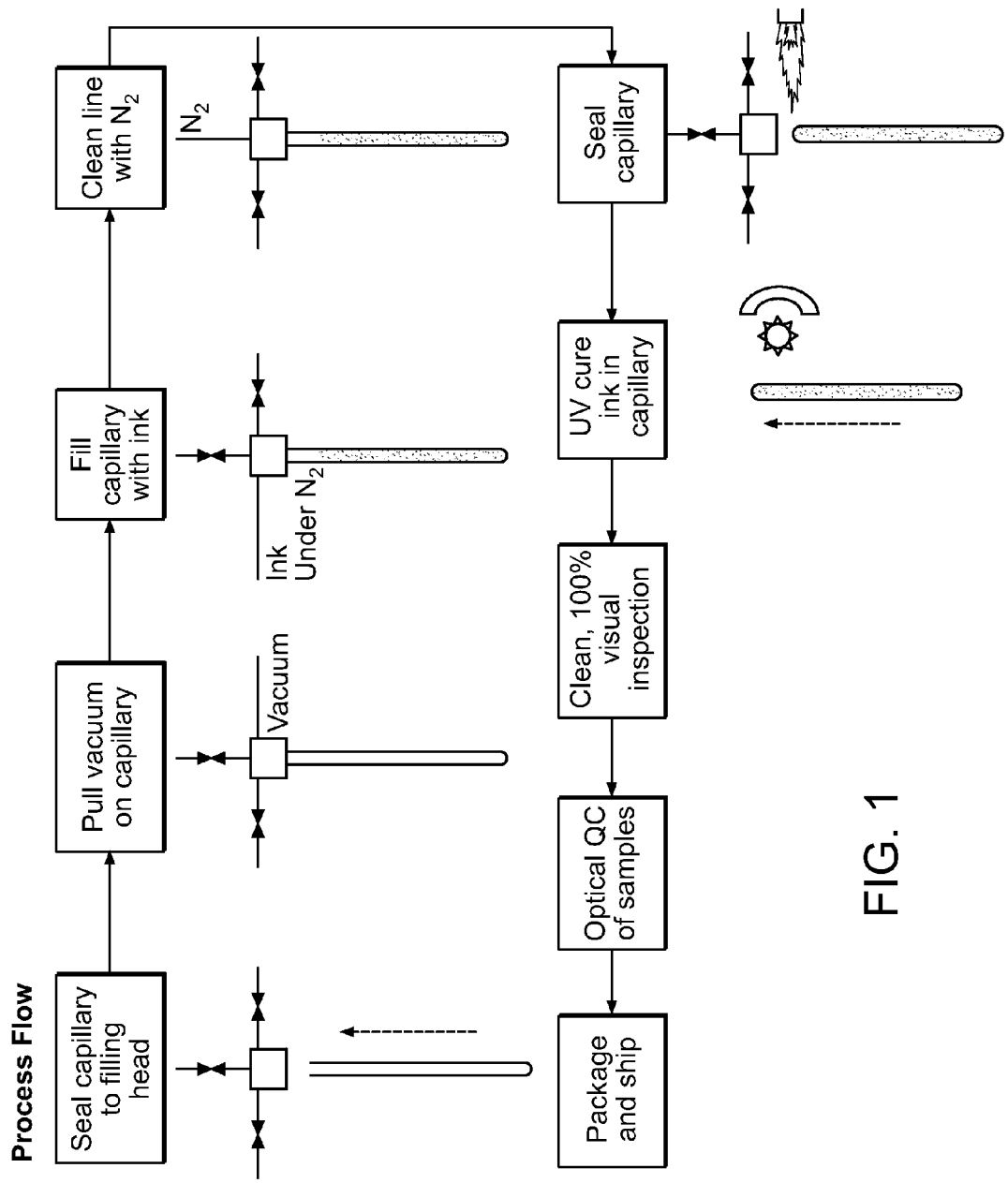
FIG. 1 is a flow chart describing a capillary fill procedure.

The attached figures are simplified representations presented for purposes of illustration only; the actual structures may differ in numerous respects, including, e.g., relative scale, etc.

For a better understanding to the present invention, together with other advantages and capabilities thereof, reference is made to the following disclosure and appended claims in connection with the above-described drawings.

DETAILED DESCRIPTION OF THE INVENTION

Embodiments of the present invention are directed to methods of storing quantum dot formulations. Quantum dot formulations are known to those of skill in the art and include quantum dots within a polymerizable formulation. According to one aspect, quantum dot formulations are made by combining quantum dots with a liquid formulation to produce a flowable formulation. Such flowable formulations may be referred to as quantum dot inks. Such quantum dot formulations may be made under an inert atmosphere, i.e. one lacking oxygen, as the presence of oxygen may be disadvantageous insofar as ingredients of the quantum dot formulation, such as the quantum dots themselves, may react with oxygen or oxygen may otherwise detrimentally affect the performance of the quantum dots. For example, the presence of oxygen may lead to photo-oxidation of the quantum dots under operating conditions of elevated temperature and light flux. Due to oxygen sensitivity, oxygen is often eliminated during the quantum dot formulation manufacturing process, which results in the quantum dot formulation being under an inert atmosphere or a vacuum. Alternatively, quantum dot formulations can be manufactured under an atmosphere including oxygen. However, oxygen may be removed before the quantum dot formulation is used, for example, in an optical component, light device, display, or other end-use application.

According to aspects of the present disclosure, oxygen is included into quantum dot formulations. According to aspect of the present disclosure, quantum dot formulations are subjected to an atmosphere including oxygen wherein oxygen is introduced into quantum dot formulation. Such an atmosphere including oxygen can be referred to as an "oxygen-containing atmosphere." According to one aspect, the oxygen-containing atmosphere can be air, such as ambient air. According to an additional aspect, the amount of oxygen in the oxygen-containing atmosphere should be at least about 1% to about 100% of the oxygen containing atmosphere. According to an additional aspect, the amount of oxygen in the oxygen-containing atmosphere should be at least about 5% to about 21% of the oxygen containing atmosphere. Gases in the oxygen-containing atmosphere may be one or more inert gases. According to one aspect, the oxygen-containing atmosphere is moisture free or substantially moisture free.

For example, oxygen is included in a quantum dot formulation if the quantum dot formulation is to be stored for an indefinite period of time prior to use or if the quantum dot formulation is to be transported from a first location to a second location. For example, quantum dot formulations are placed under an atmosphere including oxygen if the quantum dot formulation is to be stored for an indefinite period of time prior to use or if the quantum dot formulation is to be transported from a first location to a second location. For example, oxygen is included in a quantum dot formulation and the quantum dot formulation is placed under an atmosphere including oxygen if the quantum dot formulation is to be stored for an indefinite period of time prior to use or if the quantum dot formulation is to be transported from a first location to a second location. According to one aspect, the quantum dot formulation may be maintained under an oxygen-containing atmosphere for the shelf life of one or more polymerizable compounds within the quantum dot formulation, such as one year from the date of manufacture of the one or more polymerizable compounds.

According to one aspect, oxygen is included in the quantum dot formulation by handling the quantum dot formulation in air, e.g., by transferring the formulation into a container in air. According to one aspect, oxygen is mixed into the quantum dot formulation such as to dissolve oxygen in the quantum dot formulation and/or the quantum dot formulation is placed under an atmosphere including oxygen. According to one aspect, the amount of oxygen in the oxygen-containing atmosphere or otherwise dissolved within the quantum dot formulation is sufficient to inhibit, and preferably prevent, undesired reaction or polymerization of the reactive or polymerizable compounds within the quantum dot formulation.

According to one aspect, the quantum dot formulation includes an inhibitor compound which inhibits undesired polymerization of the quantum dot formulation which may otherwise occur over time after manufacture of the formulation. Without wishing to be bound by scientific theory, oxygen present in the quantum dot formulation scavenges free radicals thereby inhibiting undesired free radical polymerization of the polymerizable compounds in the quantum dot formulation. Accordingly, oxygen is included in the quantum dot formulation in an amount sufficient to scavenge free radicals and inhibit free radical polymerization of the polymerizable compounds in the quantum dot formulation. Without wishing to be bound by scientific theory, oxygen present in the quantum dot formulation scavenges free radicals and then reacts with the inhibitor compounds thereby removing free radicals from the quantum dot formulation and inhibiting undesired free radical polymerization of the polymerizable compounds in the quantum dot formulation. Accordingly, oxygen is included in the quantum dot formulation in an amount relative to the inhibitor compound. According to one aspect, oxygen is included in the quantum dot formulation in an amount effective to scavenge free radicals and react with the inhibitor compound thereby removing the free radical from the quantum dot formulation. According to one aspect, oxygen is supplemented to the quantum dot formulation over a period of time to provide an effective or sufficient amount of oxygen to scavenge free radicals from the quantum dot formulation and react with the inhibitor compound thereby removing free radicals from the quantum dot formulation.

Accordingly, methods are provided for maintaining a quantum dot formulation during storage by subjecting the quantum dot formulation to an oxygen-containing atmosphere or otherwise dissolving oxygen in the quantum dot formulation and inhibiting reaction or polymerization of reactive or polymerizable compounds within the quantum dot formulation. According to one aspect, the quantum dot formulation is protected against undesired reaction or polymerization of reactive or polymerizable compounds within the quantum dot formulation during storage. Methods are further provided for maintaining a quantum dot formulation during transportation from a first location to a second location by subjecting the quantum dot formulation to an oxygen-containing atmosphere or otherwise dissolving oxygen in the quantum dot formulation and then transporting the quantum dot formulation. According to one aspect, the quantum dot formulation is protected against undesired reaction or polymerization of reactive or polymerizable compounds within the quantum dot formulation during transportation.

According to certain aspects, a quantum dot formulation is introduced into a container, oxygen is dissolved in the quantum dot formulation and the quantum dot formulation is subjected to an oxygen-containing atmosphere and the container is closed or otherwise sealed thereby preventing the quantum dot formulation from exiting the container and thereby maintaining the quantum dot formulation under an oxygen-containing atmosphere until use of the quantum dot formulation is desired. Oxygen can be added to the quantum dot formulation by bubbling oxygen through the quantum dot formulation. Oxygen can be added to the quantum dot formulation by agitating, stirring or mixing the quantum dot formulation while under an oxygen containing atmosphere in a manner to dissolve oxygen in the quantum dot formulation. Oxygen can be added to the quantum dot formulation by placing the quantum dot formulation under an oxygen-containing atmosphere and allowing the oxygen to diffuse into the quantum dot formulation.

According to one aspect, a quantum dot formulation having oxygen dissolved therein is provided. According to one aspect, a container is provided which includes a quantum dot formulation subject to an oxygen-containing atmosphere. According to one aspect, a container is provided which includes a quantum dot formulation having oxygen dissolved, therein. According to one aspect, a container is provided which includes a quantum dot formulation having oxygen dissolved therein and which is subject to an oxygen-containing atmosphere. According to one aspect, a quantum dot formulation is transferred under an oxygen containing atmosphere, such as by pouring or pipetting, to a container. The container is maintained under an oxygen-containing atmosphere and the container is sealed.

According to additional aspects of the present disclosure, a quantum dot formulation including dissolved oxygen and which is maintained under an oxygen containing atmosphere is then processed for use. According to one aspect, oxygen within the quantum dot formulation is removed. Exemplary methods of removing oxygen from a quantum dot formulation include introducing an inert gas into the quantum dot formulation for a period of time sufficient to remove the dissolved oxygen from the quantum dot formulation. Exemplary methods of removing oxygen from a quantum dot formulation include sparging. Sparging is a process well known to those of skill in the art and includes flushing or bubbling or otherwise subjecting the quantum dot formulation to an inert or sparging gas such that dissolved oxygen is removed from the quantum dot formulation. According to one aspect, the sparged quantum dot formulation includes no or substantially no oxygen. According to one aspect, a sparged quantum dot formulation is provided. According to one aspect, the inert gas is nitrogen, helium, neon, argon, krypton, xenon, radon or other inert gas. Sparging can be carried out by simply bubbling inert gas through the quantum dot formulation for a period of time sufficient to purge the quantum dot formulation of oxygen.

According to an additional aspect, gas within the quantum dot formulation is removed. The gas can be oxygen or it can be any other gas present within the quantum dot formulation. Gas can be present within the quantum dot formulation by dissolving oxygen within the quantum dot formulation. Gas can be present within the quantum dot formulation by sparging the quantum dot formulation with a sparging gas, such as an inert gas. Methods of degassing a fluid are well known to those of skill in the art and include sparging with a different gas, heating and filtering and vacuum degassing. Vacuum degassing can be carried out by subjecting the quantum dot formulation to a vacuum to draw off the oxygen from within the quantum dot formulation. The quantum dot formulation can be agitated or mixed or recirculated under vacuum to promote the removal of dissolved oxygen. Other degassing methods exist including sonication and membrane degassing. Quantum dot formulations which have been degassed include no or substantially no oxygen. Quantum dot formulations which have been degassed include no or substantially no gases. According to one aspect, a degassed quantum dot formulation is provided.

According to one aspect, a quantum dot formulation including oxygen may be subjected to both sparging and degassing. The quantum dot formulation may be sparged to remove the oxygen from the quantum dot formulation and then the sparged quantum dot formulation may be degassed, such as by vacuum, to remove gas from within the quantum dot formulation. Accordingly, the present disclosure includes a quantum dot formulation which has been sparged and degassed. According to one aspect, a sparged and degassed quantum dot formulation is provided.

According to one aspect, a sparged and/or degassed quantum dot formulation is introduced into a vessel, tube or container to create an optical component or is otherwise included into a formulation used to make a quantum dot film. The quantum dot formulation is subject to conditions which promote polymerization of the polymerizable materials into a polymer matrix including the quantum dot. According to certain aspects of the present disclosure, a vessel in the shape of a tube is provided which includes quantum dots under oxygen-free conditions. The tube is hollow and can be fashioned from various light transmissive materials including glass.

According to one aspect, one or both ends of the glass tube may be sealed. The seal can be of any size or length. One exemplary dimension is that the distance from the end of the capillary to the beginning of the optically active area is between about 2 mm to about 8 mm, with about 3 mm or 5 mm being exemplary. Sealing methods and materials are known to those of skill in the art and include glass seal, epoxy, silicone, acrylic, light or heat curable polymers and metal. A commercially available sealing material is CERA-SOLZER available from MBR Electronics GmbH (Switzerland). Suitable metals or metal solders useful as sealing materials to provide a hermetic seal and good glass adhesion include indium, indium tin, and indium tin and bismuth alloys, as well as eutetics of tin and bismuth. One exemplary solder includes indium #316 alloy commercially available from McMaster-Carr. Sealing using solders may be accomplished using conventional soldering irons or ultrasonic soldering baths known to those of skill in the art. Ultrasonic methods provide fluxless sealing using indium solder in particular. Seals include caps of the sealing materials having dimensions suitable to fit over and be secured to an end of the tube. According to one embodiment, one end of the tube is sealed with glass and the other end is sealed with epoxy. According to one aspect, the glass tube with a quantum dot matrix therein is hermetically sealed. Examples of sealing techniques include but are not limited to, (1) contacting an open end of a tube with an epoxy, (2) drawing the epoxy into the open end due to shrinkage action of a curing resin, or (3) covering the open end with a glass adhering metal such as a glass adhering solder or other glass adhering material, and (4) melting the open end by heating the glass above the melting point of the glass and pinching the walls together to close the opening to form a molten glass hermetic seal.

In certain embodiments, for example, a tube is filled with a sparged and degassed liquid quantum dot formulation under oxygen free conditions, the end or ends of the tube are sealed under oxygen-free conditions and the liquid quantum dot formulation is UV cured. Tubes for containing quantum dot formulations for the manufacture of optical components can be selected based on the intended end-use application. An oxygen-free condition refers to a condition or an atmosphere where oxygen is substantially or completely absent. An oxygen-free condition can be provided by a nitrogen atmosphere or other inert gas atmosphere where oxygen is absent or substantially absent. In addition, an oxygen-free condition can be provided by placing the quantum dot formulation under vacuum.

According to one aspect, a borosilicate glass tube is filled under oxygen free conditions with a sparged and degassed quantum dot formulation. Accordingly, the quantum dot formulation within the tube is substantially or completely free of oxygen. Glass capillaries are maintained under conditions of suitable time, pressure and temperature sufficient to dry the glass capillaries. A sparged and degassed quantum dot ink formulation is maintained in a quantum dot ink vessel under nitrogen. Dried capillaries with one end open are placed into a vacuum fill vessel with an open end down into quantum dot ink. The quantum dot ink vessel is connected to the vacuum fill vessel via tubing and valves such that ink is able to flow from the quantum dot ink vessel to the vacuum fill vessel by applying pressure differentials. The pressure within the vacuum fill vessel is reduced to less than 200 mtorr and then repressurized with nitrogen. Quantum dot ink is admitted into the vacuum fill vessel by pressurization of the quantum dot ink vessel and the capillaries are allowed to fill under oxygen free conditions. Alternatively, the vacuum fill vessel can be evacuated thereby drawing the fluid up into the capillaries. After the capillaries are filled, the system is bled to atmospheric pressure. The exterior of the capillaries are then cleaned using toluene.

According to an additional embodiment with reference to FIG. 1, a capillary with one end sealed is connected to a filling or manifold head capable of docking with the capillary and switching between vacuum and ink fill. The capillary is evacuated by a vacuum having a vacuum capability of less than 200 mTorr. Sparged and degassed quantum dot ink under nitrogen pressure is then filled into the capillary. The quantum dot ink or formulation is under an oxygen-free condition, i.e., oxygen is substantially or completely absent. The lines and filling head are flushed with nitrogen. The capillary is held under an atmosphere of nitrogen or vacuum and the end sealed, such as by melting the capillary end and sealing, for example by a capillary sealing system. The ink may then be cured in the capillary using UV light in a UV curing apparatus for curing quantum dot ink.

In certain embodiments, for example, the quantum dot formulation within the vessel or tube or capillary completely or substantially lacks oxygen and can be cured with an H or D bulb emitting 900-1000 mjoules/cm$^2$ with a total dosage over about 1 to about 5 minutes. Alternatively, curing can be accomplished using a Dymax 500EC UV Curing Flood system equipped with a mercury UVB bulb. In such case, a lamp intensity (measured as 33 mW/cm$^2$ at a distance of about 7" from the lamp housing) can be effective, with the capillary being cured for 10-15 seconds on each side while being kept at a distance of 7 inches from the lamp housing. After curing, the edges of the capillary can be sealed thereby providing a cured quantum dot formulation under oxygen free conditions.

In certain embodiments relating to a temporary seal, sealing can comprise using an optical adhesive or silicone to seal one or both ends or edges of the capillary. For example, a drop of optical adhesive can be placed on each edge of the capillary and cured. An example of an optical adhesive includes, but is not limited to, NOA-68T obtainable from Norland Optics. For example, a drop of such adhesive can be placed on each edge of the capillary and cured (e.g., for 20 seconds with a Rolence Enterprise Model Q-Lux-UV lamp).

In certain embodiments, sealing can comprise using glass to seal one or both ends or edges of the capillary. This can be done by briefly bringing a capillary filled with cured quantum dot ink into brief contact with an oxygen/Mapp gas flame until the glass flows and seals the end. Oxygen-hydrogen flames may be used as well as any other mixed gas flame. The heat may also be supplied by laser eliminating the need for an open flame. In certain embodiments, both ends of a capillary filled with uncured quantum dot ink under oxygen-free conditions can be sealed, allowing the ink to then be photocured in the sealed capillary.

In certain embodiments, the capillary is hermetically sealed, i.e., impervious to gases and moisture, thereby providing a sealed capillary where oxygen is substantially or completely absent.

In certain embodiments, the capillary is pseudo-hermetically sealed, i.e., at least partially impervious to gases and moisture.

Other suitable techniques can be used for sealing the ends or edges of the capillary.

In certain aspects and embodiments of the inventions taught herein, the tube including the cured quantum dot formulation (optical material) may optionally be exposed to light flux for a period of time sufficient to increase the photoluminescent efficiency of the optical material.

In certain embodiments, the optical material is exposed to light and heat for a period of time sufficient to increase the photoluminescent efficiency of the optical material.

In preferred certain embodiments, the exposure to light or light and heat is continued for a period of time until the photoluminescent efficiency reaches a substantially constant value.

In one embodiment, for example, after the optic is filled with sparged and degassed quantum dot containing ink under oxygen free conditions, cured, and sealed (regardless of the order in which the curing and sealing steps are conducted), the optic is exposed, to 25-35 mW/cm$^2$ light flux with a wavelength in a range from about 365 nm to about 470 nm, while at a temperature of in a range from about 25° C. to about 80° C., for a period of time sufficient to increase the photoluminescent efficiency of the ink. In one embodiment, for example, the light has a wavelength of about 450 nm, the light flux is 30 mW/cm$^2$, the temperature is 80° C., and the exposure time is 3 hours. Alternatively, the quantum dot containing ink can be cured within the tube before sealing one or both ends of the tube.

According to one aspect of the present invention, a polymerizable composition including quantum dots is provided. Quantum dots may be present in the polymerizable composition in an amount from about 0.05% w/w to about 5.0% w/w. According to one aspect, the polymerizable composition is photopolymerizable. The polymerizable composition is in the form of a fluid which can be placed within the tube under oxygen-free conditions and then one or both ends sealed with the tube being hermetically sealed to avoid oxygen being within the tube. The polymerizable composition is then subjected to light of sufficient intensity and for a period of time sufficient to polymerize the polymerizable composition, and in one aspect, in the absence of oxygen. The period of time can range between about 10 seconds to about 6 minutes or between about 1 minute to about 6 minutes. According to one embodiment, the period of time is sufficiently short to avoid agglomeration of the quantum dots prior to formation of a polymerized matrix. Agglomeration can result in FRET and subsequent loss of photoluminescent performance.

The polymerizable composition includes quantum dots in combination with one or more of a polymerizable composition. According to one aspect, the polymerizable composition avoids, resists or inhibits yellowing when in the form of a matrix, such as a polymerized matrix. A matrix in which quantum dots are dispersed may be referred to as a host material. Host materials include polymeric and non-polymeric materials that are at least partially transparent, and preferably fully transparent, to preselected wavelengths of light.

According to an additional aspect, the polymerizable composition is selected so as to provide sufficient ductility to the polymerized matrix. Ductility is advantageous in relieving the stresses on the tube that occur during polymer shrinkage when the polymer matrix is cured. Suitable polymerizable compositions act as solvents for the quantum dots and so combinations of polymerizable compositions can be selected based on solvent properties for various quantum dots.

Polymerizable compositions include monomers and oligomers and polymers and mixtures thereof. Exemplary monomers include lauryl methacrylate, norbornyl methacrylate, Ebecyl 150 (Cytec), CD590 (Cytec) and the like. Polymerizable materials can be present in the polymerizable formulation in an amount greater than 50 weight percent. Examples include amounts in a range greater than 50 to about 99.5 weight percent, greater than 50 to about 98 weight percent, greater than 50 to about 95 weight percent, from about 80 to about 99.5 weight percent, from about 90 to about 99.95 weight percent, from about 95 to about 99.95 weight percent. Other amounts outside these examples may also be determined to be useful or desirable.

Exemplary polymerizable compositions further include one or more of a crosslinking agent, a scattering agent, a rheology modifier, a filler, and a photoinitiator.

Suitable crosslinking agents include ethylene glycol dimethacrylate, Ebecyl 150 and the like. Crosslinking agents can be present in the polymerizable formulation in an amount between about 0.5 wt % and about 3.0 wt %. Crosslinking agents are generally added, for example in an amount of 1% w/w, to improve stability and strength of a polymer matrix which helps avoid cracking of the matrix due to shrinkage upon curing of the matrix.

Suitable scattering agents include $TiO_2$, alumina, barium sulfate, PTFE, barium titantate and the like. Scattering agents can be present in the polymerizable formulation in an amount between about 0.05 wt % and about 1.0 wt %. Scattering agents are generally added, for example in a preferred amount of about 0.15% w/w, to promote outcoupling of emitted light.

Suitable rheology modifiers (thixotropes) include fumed silica commercially available from Cabot Corporation such as TS-720 treated fumed silica, treated silica commercially available from Cabot Corporation such as TS720, TS500, TS530, TS610 and hydrophilic silica such as M5 and EHS commercially available from Cabot Corporation. Rheology modifiers can be present in the polymerizable formulation in an amount between about 5% w/w to about 12% w/w. Rheology modifiers or thixotropes act to lower the shrinkage of the matrix resin and help prevent cracking. Hydrophobic rheology modifiers disperse more easily and build viscosity at higher loadings allowing for more filler content and less shrinkage to the point where the formulation becomes too viscous to fill the tube. Rheology modifiers such as fumed silica also provide higher EQE and help to prevent settling of $TiO_2$ on the surface of the tube before polymerization has taken place.

Suitable fillers include silica, fumed silica, precipitated silica, glass beads, PMMA beads and the like. Fillers can be present in the polymerizable formulation in an amount between about 0.01% and about 60%, about 0.01% and about 50%, about 0.01% and about 40%, about 0.01% and about 30%, about 0.01% and about 20% and any value or range in between whether overlapping or not.

Suitable photoinitiators include Irgacure 2022, KTO-46 (Lambert), Esacure 1 (Lambert) and the like. Photoinitiators can be present in the polymerizable formulation in an amount between about 0.1% w/w to about 5% w/w. Photoinitiators generally help to sensitize the polymerizable composition to UV light for photopolymerization. Thermal initiators such as AIBN or peroxides can also be used.

Suitable inhibitor compounds which require oxygen to inhibit undesired polymerization or otherwise protect polymerizable compounds from polymerization include those disclosed in Kice, J. Am. Chem. Soc., 1954, 76(24), pp. 6274-6280 or Becker et al., Chem. Eng. Technol. 2006, 29, No. 10, 1227-1231 each of which are hereby incorporated by reference in their entireties. Such inhibitor compounds include hydroquinone (HQ), hydroquinone monomethyl ether (MEHQ), phenothiazin, 2,2'-azo-bis-isobutyronitrile, 2,2-diphenyl-1-picrylhydrazyl, benzoquinone, chloranil, furfurylidene malononitrile, benzhydrilidene malononitrile, trinitrotoluene, m-dinitrobenzene, p-nitrotoluene, diphenylamine, BHT or other hindered phenols and the like.

According to additional aspects, quantum dots are nanometer sized particles that can have optical properties arising from quantum confinement. The particular composition(s), structure, and/or size of a quantum dot can be selected to achieve the desired wavelength of light to be emitted from the quantum dot upon stimulation with a particular excitation source. In essence, quantum dots may be tuned to emit light across the visible spectrum by changing their size. See C. B. Murray, C. R. Kagan, and M. G. Bawendi, *Annual Review of Material Sci.*, 2000, 30: 545-610 hereby incorporated by reference in its entirety.

Quantum dots can have an average particle size in a range from about 1 to about 1000 nanometers (nm), and preferably in a range from about 1 to about 100 nm. In certain embodiments, quantum dots have an average particle size in a range from about 1 to about 20 nm (e.g., such as about 5, 6, 7, 8, 9, 10, 11, 12, 13, 14, 15, 16, 17, 18, 19, or 20 nm). In certain embodiments, quantum dots have an average particle size in a range from about 1 to about 10 nm. Quantum dots can have an average diameter less than about 150 Angstroms (Å). In certain embodiments, quantum dots having an average diameter in a range from about 12 to about 150 Å can be particularly desirable. However, depending upon the composition, structure, and desired emission wavelength of the quantum dot, the average diameter may be outside of these ranges.

Preferably, a quantum dot comprises a semiconductor nanocrystal. In certain embodiments, a semiconductor nanocrystal has an average particle size in a range from about 1 to about 20 nm, and preferably from about 1 to about 10 nm. However, depending upon the composition, structure, and desired emission wavelength of the quantum dot, the average diameter may be outside of these ranges.

A quantum dot can comprise one or more semiconductor materials.

Examples of semiconductor materials that can be included in a quantum dot (including, e.g., semiconductor nanocrystal) include, but are not limited to, a Group IV element, a Group II-VI compound, a Group II-V compound, a Group III-VI compound, a Group III-V compound, a Group IV-VI compound, a Group compound, a Group II-IV-VI compound, a Group II-IV-V compound, an alloy including any of the foregoing, and/or a mixture including any of the foregoing, including ternary and quaternary mixtures or alloys. A non-limiting list of examples include ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

In certain embodiments, quantum dots can comprise a core comprising one or more semiconductor materials and a shell comprising one or more semiconductor materials, wherein the shell is disposed over at least a portion, and preferably all, of the outer surface of the core. A quantum dot including a core and shell is also referred to as a "core/shell" structure.

For example, a quantum dot can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as quantum dot cores include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

A shell can be a semiconductor material having a composition that is the same as or different from the composition of the core. The shell can comprise an overcoat including one or more semiconductor materials on a surface of the core. Examples of semiconductor materials that can be included in a shell include, but are not limited to, a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, alloys including any of the foregoing, and/or mixtures including any of the foregoing, including ternary and quaternary mixtures or alloys. Examples include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing. For example, ZnS, ZnSe or CdS overcoatings can be grown on CdSe or CdTe semiconductor nanocrystals.

In a core/shell quantum dot, the shell or overcoating may comprise one or more layers. The overcoating can comprise at least one semiconductor material which is the same as or different from the composition of the core. Preferably, the overcoating has a thickness from about one to about ten monolayers. An overcoating can also have a thickness greater than ten monolayers. In certain embodiments, more than one overcoating can be included on a core.

In certain embodiments, the surrounding "shell" material can have a band gap greater than the band gap of the core material. In certain other embodiments, the surrounding shell material can have a band gap less than the band gap of the core material.

In certain embodiments, the shell can be chosen so as to have an atomic spacing close to that of the "core" substrate. In certain other embodiments, the shell and core materials can have the same crystal structure.

Examples of quantum dot (e.g., semiconductor nanocrystal) (core)shell materials include, without limitation: red (e.g., (CdSe)CdZnS (core)shell), green (e.g., (CdZnSe)CdZnS (core)shell, etc.), and blue (e.g., (CdS)CdZnS (core) shell.

Quantum dots can have various shapes, including, but not limited to, sphere, rod, disk, other shapes, and mixtures of various shaped particles.

One example of a method of manufacturing a quantum dot (including, for example, but not limited to, a semiconductor nanocrystal) is a colloidal growth process. Colloidal growth occurs by injection an M donor and an X donor into a hot coordinating solvent. One example of a preferred method for preparing monodisperse quantum dots comprises pyrolysis of organometallic reagents, such as dimethyl cadmium, injected into a hot, coordinating solvent. This permits discrete nucleation and results in the controlled growth of macroscopic quantities of quantum dots. The injection produces a nucleus that can be grown in a controlled manner to form a quantum dot. The reaction mixture can be gently heated to grow and anneal the quantum dot. Both the average size and the size distribution of the quantum dots in a sample are dependent on the growth temperature. The growth temperature for maintaining steady growth increases with increasing average crystal size. Resulting quantum dots are members of a population of quantum dots. As a result of the discrete nucleation and controlled growth, the population of quantum dots that can be obtained has a narrow, monodisperse distribution of diameters. The monodisperse distribution of diameters can also be referred to as a size. Preferably, a monodisperse population of particles includes a population of particles wherein at least about 60% of the particles in the population fall within a specified particle size range. A population of monodisperse particles preferably deviate less than 15% rms (root-mean-square) in diameter and more preferably less than 10% rms and most preferably less than 5%.

An example of an overcoating process is described, for example, in U.S. Pat. No. 6,322,901. By adjusting the temperature of the reaction mixture during overcoating and monitoring the absorption spectrum of the core, overcoated materials having high emission quantum efficiencies and narrow size distributions can be obtained.

The narrow size distribution of the quantum dots (including, e.g., semiconductor nanocrystals) allows the possibility of light emission in narrow spectral widths. Monodisperse semiconductor nanocrystals have been described in detail in Murray et al. (J. Am. Chem. Soc., 115:8706 (1993)); in the thesis of Christopher Murray, and "Synthesis and Characterization of II-VI Quantum Dots and Their Assembly into 3-D Quantum Dot Superlattices", Massachusetts Institute of Technology, September, 1995. The foregoing are hereby incorporated herein by reference in their entireties.

The process of controlled growth and annealing of the quantum dots in the coordinating solvent that follows nucleation can also result in uniform surface derivatization and regular core structures. As the size distribution sharpens, the temperature can be raised to maintain steady growth. By adding more M donor or X donor, the growth period can be shortened. The M donor can be an inorganic compound, an organometallic compound, or elemental metal. For example, an M donor can comprise cadmium, zinc, magnesium, mercury, aluminum, gallium, indium or thallium, and the X donor can comprise a compound capable of reacting with the M donor to form a material with the general formula MX. The X donor can comprise a chalcogenide donor or a pnictide donor, such as a phosphine chalcogenide, a bis (silyl) chalcogenide, dioxygen, an ammonium salt, or a tris(silyl) pnictide. Suitable X donors include, for example, but are not limited to, dioxygen, bis(trimethylsilyl) selenide ($(TMS)_2Se$), trialkyl phosphine selenides such as (tri-noctylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl) telluride ($(TMS)_2Te$), bis(trimethylsilyl)sulfide ($(TMS)_2S$), a trialkyl phosphine sulfide such as (tri-noctylphosphine) sulfide (TOPS), an ammonium salt such as an ammonium halide (e.g., $NH_4Cl$), tris(trimethylsilyl) phosphide ($(TMS)_3P$), tris(trimethylsilyl) arsenide ($(TMS)_3As$), or tris (trimethylsilyl) antimonide ($(TMS)_3Sb$). In certain embodiments, the M donor and the X donor can be moieties within the same molecule.

A coordinating solvent can help control the growth of the quantum dot. A coordinating solvent is a compound having a donor lone pair that, for example, a lone electron pair available to coordinate to a surface of the growing quantum dot (including, e.g., a semiconductor nanocrystal). Solvent coordination can stabilize the growing quantum dot. Examples of coordinating solvents include alkyl phosphines, alkyl phosphine oxides, alkyl phosphonic acids, or alkyl phosphinic acids, however, other coordinating solvents, such as pyridines, furans, and amines may also be suitable for the quantum dot (e.g., semiconductor nanocrystal) production. Additional examples of suitable coordinating solvents include pyridine, tri-n-octyl phosphine (TOP), tri-n-octyl phosphine oxide (TOPO) and trishydroxylpropylphosphine (tHPP), tributylphosphine, tri (dodecyl)phosphine, dibutyl-phosphite, tributyl phosphite, trioctadecyl phosphite, trilauryl phosphite, tris(tridecyl) phosphite, triisodecyl phosphite, bis(2-ethylhexyl)phosphate, tris(tridecyl) phosphate, hexadecylamine, oleylamine, octadecylamine, bis(2-ethylhexyl)amine, octylamine, dioctylamine, trioctylamine, dodecylamine/laurylamine, didodecylamine tridodecylamine, hexadecylamine, dioctadecylamine, trioctadecylamine, phenylphosphonic acid, hexylphosphonic acid, tetradecylphosphonic acid, octylphosphonic acid, octadecylphosphonic acid, propylenediphosphonic acid, phenylphosphonic acid, aminohexylphosphonic acid, dioctyl ether, diphenyl ether, methyl myristate, octyl octanoate, and hexyl octanoate. In certain embodiments, technical grade TOPO can be used.

In certain embodiments, quantum dots can alternatively be prepared with use of non-coordinating solvent(s).

Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals. For example, for CdSe and CdTe, by stopping growth at a particular semiconductor nanocrystal average diameter and choosing the proper composition of the semiconducting material, the emission spectra of the semiconductor nanocrystals can be tuned continuously over the wavelength range of 300 nm to 5 microns, or from 400 nm to 800 nm.

The particle size distribution of the quantum dots (including, e.g., semiconductor nanocrystals) can be further refined by size selective precipitation with a poor solvent for the quantum dots, such as methanol/butanol. For example, quantum dots can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected quantum dot (e.g., semiconductor nanocrystal) population preferably has no more than a 15% rms deviation from mean diameter, more preferably 10% rms deviation or less, and most preferably 5% rms deviation or less.

Semiconductor nanocrystals and other types of quantum dots preferably have ligands attached thereto. According to one aspect, quantum dots within the scope of the present invention include green CdSe quantum dots having oleic acid ligands and red CdSe quantum dots having oleic acid ligands. Alternatively, or in addition, octadecylphosphonic acid ("ODPA") ligands may be used instead of oleic acid ligands. The ligands promote solubility of the quantum dots in the polymerizable composition which allows higher loadings without agglomeration which can lead to red shifting.

Ligands can be derived from a coordinating solvent that may be included in the reaction mixture during the growth process.

Ligands can be added to the reaction mixture.

Ligands can be derived from a reagent or precursor included in the reaction mixture for synthesizing the quantum dots.

In certain embodiments, quantum dots can include more than one type of ligand attached to an outer surface.

A quantum dot surface that includes ligands derived from the growth process or otherwise can be modified by repeated exposure to an excess of a competing ligand group (including, e.g., but not limited to, coordinating group) to form an overlayer. For example, a dispersion of the capped quantum dots can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanoparticle, including, for example, but not limited to, phosphines, thiols, amines and phosphates.

For example, a quantum dot can be exposed to short chain polymers which exhibit an affinity for the surface and which terminate in a moiety having an affinity for a suspension or dispersion medium. Such affinity improves the stability of the suspension and discourages flocculation of the quantum dot. Examples of additional ligands include fatty acid ligands, long chain fatty acid ligands, alkyl phosphines, alkyl phosphine oxides, alkyl phosphonic acids, or alkyl phosphinic acids, pyridines, furans, and amines. More specific examples include, but are not limited to, pyridine, tri-n-octyl phosphine (TOP), tri-n-octyl phosphine oxide (TOPO), tris-hydroxylpropylphosphine (tHPP) and octadecylphosphonic acid ("ODPA"). Technical grade TOPO can be used.

Suitable coordinating ligands can be purchased commercially or prepared by ordinary synthetic organic techniques, for example, as described in J. March, Advanced Organic Chemistry, which is incorporated herein by reference in its entirety.

The emission from a quantum dot capable of emitting light can be a narrow Gaussian emission band that can be tuned through the complete wavelength range of the ultraviolet, visible, or infra-red regions of the spectrum by varying the size of the quantum dot, the composition of the quantum dot, or both. For example, a semiconductor nanocrystal comprising CdSe can be tuned in the visible region; a semiconductor nanocrystal comprising InAs can be tuned in the infra-red region. The narrow size distribution of a population of quantum dots capable of emitting light can result in emission of light in a narrow spectral range. The population can be monodisperse preferably exhibits less than a 15% rms (root-mean-square) deviation in diameter of such quantum dots, more preferably less than 10%, most preferably less than 5%. Spectral emissions in a narrow range of no greater than about 75 nm, preferably no greater than about 60 nm, more preferably no greater than about 40 nm, and most preferably no greater than about 30 nm full width at half max (FWHM) for such quantum dots that emit in the visible can be observed. IR-emitting quantum dots can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of the light-emitting quantum dot diameters decreases.

Quantum dots can have emission quantum efficiencies such as greater than 10%, 20%, 30%, 40%, 50%, 60%, 70%, 80%, or 90%.

The narrow FWHM of quantum dots can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of quantum dots will emit light spanning a narrow range of wavelengths.

Useful quantum dots according to the present invention are those that emit wavelengths characteristic of red light. In certain preferred embodiments, quantum dots capable of emitting red light emit light having a peak center wavelength in a range from about 615 nm to about 635 nm, and any wavelength or range in between whether overlapping or not. For example, the quantum dots can be capable or emitting red light having a peak center wavelength of about 635 nm, about 630 nm, of about 625 nm, of about 620 nm, of about 615 nm.

Useful quantum dots according to the present invention are also those that emit wavelength characteristic of green light. In certain preferred embodiments, quantum dots capable of emitting green light emit light having a peak center wavelength in a range from about 520 nm to about 545 nm, and any wavelength or range in between whether overlapping or not. For example, the quantum dots can be capable or emitting green light having a peak center wavelength of about 520 nm, of about 525 nm, of about 535 nm, of about 540 nm or of about 540 nm.

According to further aspects of the present invention, the quantum dots exhibit a narrow emission profile in the range of between about 23 nm and about 60 nm at full width half maximum (FWHM). The narrow emission profile of quantum dots of the present invention allows the tuning of the quantum dots and mixtures of quantum dots to emit saturated colors thereby increasing color gamut and power efficiency beyond that of conventional LED lighting displays. According to one aspect, green quantum dots designed to emit a predominant wavelength of, for example, about 523 nm and having an emission profile with a FWHM of about, for example, 37 nm are combined, mixed or otherwise used in combination with red quantum dots designed to emit a predominant wavelength of about, for example, 617 nm and having an emission profile with a FWHM of about, for example 32 nm. Such combinations can be stimulated by blue light to create trichromatic white light.

Quantum dots in accordance with the present invention can be included in various formulations depending upon the desired utility. According to one aspect, quantum dots are included in flowable formulations or liquids to be included, for example, into clear vessels, such as tubes, which are to be exposed to light. Such formulations can include various amounts of one or more type of quantum dots and one or more host materials. Such formulations can further include one or more scatterers. Other optional additives or ingredients can also be included in a formulation. In certain embodiments, a formulation can further include one or more photo initiators. One of skill in the art will readily recognize from the present invention that additional ingredients can be included depending upon the particular intended application for the quantum dots.

An optical material or formulation within the scope of the invention may include a host material, such as can be included in an optical component described herein, which may be present in an amount from about 50 weight percent and about 99.5 weight percent, and any weight percent in between whether overlapping or not. In certain embodiment, a host material may be present in an amount from about 80 to about 99.5 weight percent. Examples of specific useful host materials include, but are not limited to, polymers, oligomers, monomers, resins, binders, glasses, metal oxides, and other nonpolymeric materials. Preferred host materials include polymeric and non-polymeric materials that are at least partially transparent, and preferably fully transparent, to preselected wavelengths of light. In certain embodiments, the preselected wavelengths can include wavelengths of light in the visible (e.g., 400-700 nm) region of the electromagnetic spectrum. Preferred host materials include cross-linked polymers and solvent-cast polymers. Examples of other preferred host materials include, but are not limited to, glass or a transparent resin. In particular, a resin such as a non-curable resin, heat-curable resin, or photocurable resin is suitably used from the viewpoint of processability. Specific examples of such a resin, in the form of either an oligomer or a polymer, include, but are not limited to, a melamine resin, a phenol resin, an alkyl resin, an epoxy resin, a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers or oligomers forming these resins, and the like. Other suitable host materials can be identified by persons of ordinary skill in the relevant art.

Host materials can also comprise silicone materials. Suitable host materials comprising silicone materials can be identified by persons of ordinary skill in the relevant art.

In certain embodiments and aspects of the inventions contemplated by this invention, a host material comprises a photocurable resin. A photocurable resin, may be a preferred host material in certain embodiments, e.g., in embodiments in which the composition is to be patterned. As a photocurable resin, a photo-polymerizable resin such as an acrylic acid or methacrylic acid based resin containing a reactive vinyl group, a photo-crosslinkable resin which generally contains a photo-sensitizer, such as polyvinyl cinnamate, benzophenone, or the like may be used. A heat-curable resin may be used when the photo-sensitizer is not used. These resins may be used individually or in combination of two or more.

In certain embodiments, a host material can comprise a solvent-cast resin. A polymer such as a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers or oligomers forming these resins, and the like can be dissolved in solvents known to those skilled in the art. Upon evaporation of the solvent, the resin forms a solid host material for the semiconductor nanoparticles.

In certain embodiments, acrylate monomers and/or acrylate oligomers which are commercially available from Radcure and Sartomer can be preferred.

Quantum dots can be encapsulated. Nonlimiting examples of encapsulation materials, related methods, and other information that may be useful are described in International Application No. PCT/US2009/01372 of Linton, filed 4 Mar. 2009 entitled "Particles Including Nanoparticles, Uses Thereof, And Methods" and U.S. Patent Application No. 61/240,932 of Nick et, al., filed 9 Sep. 2009 entitled "Particles Including Nanoparticles, Uses Thereof, And Methods", each of the foregoing being hereby incorporated herein by reference in its entirety.

The total amount of quantum dots included in an optical material, such as a host material for example a polymer matrix, within the scope of the invention is preferably in a range from about 0.05 weight percent to about 5 weight percent, and more preferably in a range from about 0.1 weight percent to about 5 weight percent and any value or range in between whether overlapping or not. The amount of quantum dots included in an optical material can vary within such range depending upon the application and the form in which the quantum dots are included (e.g., film, optics (e.g., capillary), encapsulated film, etc.), which can be chosen based on the particular end application. For instance, when an optic material is used in a thicker capillary with a longer pathlength (e.g., such as in BLUs for large screen television applications), the concentration of quantum dots can be closer to 0.5%. When an optical material is used in a thinner capillary with a shorter pathlength (e.g., such as in BLUs for mobile or hand-held applications), the concentration of quantum dots can be closer to 5%.

The ratio of quantum dots used in an optical material is determined by the emission peaks of the quantum dots used. For example, when quantum dots capable of emitting green light having a peak center wavelength in a range from about 514 nm to about 545 nm, and any wavelength in between whether overlapping or not, and quantum dots capable of emitting red light having a peak center wavelength in a range from about 615 nm to about 640 nm, and any wavelength in between whether overlapping or not, are used in an optical material, the ratio of the weight percent green-emitting quantum dots to the weight percent of red-emitting quantum dots can be in a range from about 12:1 to about 1:1, and any ratio in between whether overlapping or not.

The above ratio of weight percent green-emitting quantum dots to weight percent red-emitting quantum dots in an optical material can alternatively be presented as a molar ratio. For example, the above weight percent ratio of green to red quantum dots range can correspond to a green to red quantum dot molar ratio in a range from about 24.75 to 1 to about 5.5 to 1, and any ratio in between whether overlapping or not.

The ratio of the blue to green to red light output intensity in white trichromatic light emitted by a quantum dot containing BLU described herein including blue-emitting solid state inorganic semiconductor light emitting devices (having blue light with a peak center wavelength in a range from about 450 nm to about 460 nm, and any wavelength in between whether overlapping or not), and an optical material including mixtures of green-emitting quantum dots and red-emitting quantum dots within the above range of weight percent ratios can vary within the range. For example, the ratio of blue to green light output intensity therefor can be in a range from about 0.75 to about 4 and the ratio of green to red light output intensity therefor can be in a range from about 0.75 to about 2.0. In certain embodiments, for example, the ratio of blue to green light output intensity can be in a range from about 1.0 to about 2.5 and the ratio of green to red light output intensity can be in a range from about 0.9 to about 1.3.

Scatterers, also referred to as scattering agents, within the scope of the invention may be present, for example, in an amount of between about 0.01 weight percent and about 1 weight percent. Amounts of scatterers outside such range may also be useful. Examples of light scatterers (also referred to herein as scatterers or light scattering particles) that can be used in the embodiments and aspects of the inventions described herein, include, without limitation, metal or metal oxide particles, air bubbles, and glass and polymeric beads (solid or hollow). Other light scatterers can be readily identified by those of ordinary skill in the art. In certain embodiments, scatterers have a spherical shape. Preferred examples of scattering particles include, but are not limited to, $TiO_2$, $SiO_2$, $BaTiO_3$, $BaSO_4$, and $ZnO$. Particles of other materials that are non-reactive with the host material and that can increase the absorption pathlength of the excitation light in the host material can be used. In certain embodiments, light scatterers may have a high index of refraction (e.g., $TiO_2$, $BaSO_4$, etc) or a low index of refraction (gas bubbles).

Selection of the size and size distribution of the scatterers is readily determinable by those of ordinary skill in the art. The size and size distribution can be based upon the refractive index mismatch of the scattering particle and the host material in which the light scatterers are to be dispersed, and the preselected wavelength(s) to be scattered according to Rayleigh scattering theory. The surface of the scattering particle may further be treated to improve dispersability and stability in the host material. In one embodiment, the scattering particle comprises $TiO_2$ (R902+ from DuPont) of 0.2 µm particle size, in a concentration in a range from about 0.01 to about 1% by weight.

The amount of scatterers in a formulation is useful in applications where the ink is contained in a clear vessel having edges to limit losses due the total internal reflection. The amount of the scatterers may be altered relative to the amount of quantum dots used in the formulation. For example, when the amount of the scatter is increased, the amount of quantum dots may be decreased.

Examples of thixotropes which may be included in a quantum dot formulation, also referred to as rheology modifiers, include, but are not limited to, fumed metal oxides (e.g., fumed silica which can be surface treated or untreated (such as Cab-O—Sil™ fumed silica products available from Cabot Corporation), fumed metal oxide gels (e.g., a silica gel). An optical material can include an amount of thixotrope in a range from about 5 to about 12 weight percent. Other amounts outside the range may also be determined to be useful or desirable.

In certain embodiments, a formulation including quantum dots and a host material can be formed from an ink comprising quantum dots and a liquid vehicle, wherein the liquid vehicle comprises a composition including one or more functional groups that are capable of being cross-linked. The functional units can be cross-linked, for example, by UV treatment, thermal treatment, or another cross-linking technique readily ascertainable by a person of ordinary skill in a relevant art. In certain embodiments, the composition including one or more functional groups that are capable of being cross-linked can be the liquid vehicle itself. In certain embodiments, it can be a co-solvent. In certain embodiments, it can be a component of a mixture with the liquid vehicle.

One particular example of a preferred method of making an ink is as follows. A solution including quantum dots having the desired emission characteristics well dispersed in an organic solvent is concentrated to the consistency of a wax by first stripping off the solvent under nitrogen/vacuum until a quantum dot containing residue with the desired consistency is obtained. The desired resin monomer is then added under nitrogen conditions, until the desired monomer to quantum dot ratio is achieved. This mixture is then vortex mixed under oxygen free conditions until the quantum dots are well dispersed. The final components of the resin are then added to the quantum dot dispersion, and are then sonicated mixed to ensure a fine dispersion.

According to aspects of the present disclosure, the quantum dot formulation is then subjected to an oxygen-containing atmosphere for a period of time, such as a storage time or a transportation time as described herein. When the quantum dot formulation is desired to be used, the quantum dot formulation is sparged and/or degassed as described herein. The sparged and/or degassed quantum dot formulation is then introduced into a vessel or tube or container for further use an optical component, or is otherwise introduced into materials or formulations for making other quantum light materials such as films.

A tube or capillary comprising an optical material prepared from such sparged and degassed quantum dot ink can be prepared by then introducing the ink into the tube via a wide variety of methods, and then UV cured under intense illumination for some number of seconds for a complete cure. According to one aspect, the ink is introduced into the tube under oxygen-free conditions.

In certain aspects and embodiments of the inventions taught herein, the optic including the cured quantum dot containing ink is exposed to light flux for a period of time sufficient to increase the photoluminescent efficiency of the optical material.

In certain embodiments, the optical material is exposed to light and heat for a period of time sufficient to increase the photoluminescent efficiency of the optical material.

In preferred certain embodiments, the exposure to light or light and heat is continued for a period of time until the photoluminescent efficiency reaches a substantially constant value.

In one embodiment, for example, after the optic, i.e. tube or capillary, is filled with quantum dot containing ink under oxygen free conditions, cured, and sealed (regardless of the order in which the curing and sealing steps are conducted) to produce an optic having no or substantially no oxygen within the sealed optic, the optic is exposed to 25-35 mW/cm² light flux with a wavelength in a range from about 365 nm to about 470 nm while at a temperature of in a range from about 25 to 80° C., for a period of time sufficient to increase the photoluminescent efficiency of the ink. In one embodiment, for example, the light has a wavelength of about 450 nm, the light flux is 30 mW/cm², the temperature is 80° C., and the exposure time is 3 hours.

Additional information that may be useful in connection with the present disclosure and the inventions described herein is included in International Application No. PCT/US2009/002796 of Coe-Sullivan et al, filed 6 May 2009, entitled "Optical Components, Systems Including An Optical Component, And Devices"; International Application No. PCT/US2009/002789 of Coe-Sullivan et al, filed 6 May 2009, entitled: "Solid State Lighting Devices Including Quantum Confined Semiconductor Nanoparticles, An Optical Component For A Solid State Light Device, And Methods"; International Application No. PCT/US2010/32859 of Modi et al, filed 28 Apr. 2010 entitled "Optical Materials, Optical Components, And Methods"; International Application No. PCT/US2010/032799 of Modi et al, filed 28 Apr. 2010 entitled "Optical Materials, Optical Components, Devices, And Methods"; International Application No. PCT/US2011/047284 of Sadasivan et al, filed 10 Aug. 2011 entitled "Quantum Dot Based Lighting"; International Application No. PCT/US2008/007901 of Linton et al, filed 25 Jun. 2008 entitled "Compositions And Methods Including Depositing Nanomaterial"; U.S. patent application Ser. No. 12/283,609 of Coe-Sullivan et al, filed 12 Sep. 2008 entitled "Compositions, Optical Component, System Including An Optical Component, Devices, And Other Products"; International Application No. PCT/US2008/10651 of Breen et al, filed 12 Sep. 2008 entitled "Functionalized Nanoparticles And Method"; U.S. Pat. No. 6,600,175 of Baretz, et al., issued Jul. 29, 2003, entitled "Solid State White Light Emitter And Display Using Same"; and U.S. Pat. No. 6,608,332 of Shimizu, et al., issued Aug. 19, 2003, entitled "Light Emitting Device and Display"; each of the foregoing being hereby incorporated herein by reference in its entirety.

LEDs within the scope of the present invention include any conventional LED such as those commercially available from Citizen, Nichia, Osram, Cree, or Lumileds. Useful light emitted from LEDs includes white light, off white light, blue light, green light and any other light emitted from an LED.

EXAMPLE I

Preparation of Semiconductor Nanocrystals Capable of Emitting Red Light

Synthesis of CdSe Seed Cores:

262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle is removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor is then immediately submerged in partially frozen (via liquid nitrogen) squalane bath rapidly reducing the temperature of the reaction to below 100° C. The first absorption peak of the nanocrystals was 480 nm. The CdSe cores were precipitated out of the growth solution inside a nitrogen atmosphere glovebox by adding a 3:1 mixture of methanol and isopropanol. After removal of the methanol/isopropanol mixture, the isolated cores were then dissolved in hexane and used to make core-shell materials. The isolated material specifications were as follows: Optical Density @ 350 nm=2.83; Abs=481 nm; Emission=510 nm; FWHM=40 nm; Total Volume=1.9 L of hexane.

Growth of CdSe Cores:

A 1 L glass reactor was charged with 320 mL of 1-octadecene (ODE) and degassed at 120° C. for 15 minutes under vacuum. The reactor was then backfilled with $N_2$ and the temperature set to 60° C. 120 mL of the CdSe seed core above was injected into the reactor and the hexanes were removed under reduced pressure until the vacuum gauge reading was <500 mTorr. The temperature of the reaction mixture was then set to 240° C. Meanwhile, two 50 mL syringes were loaded with 80 mL of cadmium oleate in TOP (0.5 M conc.) solution and another two syringes were loaded with 80 mL of di-iso-butylphosphine selenide (DiBP-Se) in TOP (0.5 M conc.). Once the reaction mixture reached 240° C., the Cd oleate and DiBP-Se solutions were infused into the reactor at a rate of 35 mL/hr. The $1^{st}$ excitonic absorption feature of the CdSe cores was monitored during infusion and the reaction was stopped at ~60 minutes when the absorption feature was 569 nm. The resulting CdSe cores were then ready for use as is in this growth solution for overcoating.

Synthesis of CdSe/ZnS/CdZnS Core-Shell Nanocrystals:

115 mL of the CdSe core above with a first absorbance peak at 569 nm was mixed in a 1 L reaction vessel with 1-octadecene (45 mL), and Zn(Oleate) (0.5 M in TOP, 26 mL). The reaction vessel was heated to 120° C. and vacuum was applied for 15 min. The reaction vessel was then back-filled with nitrogen and heated to 310° C. The temperature was ramped, between 1° C./5 seconds and 1° C./15 seconds. Once the vessel reached 300° C., octanethiol (11.4 mL) was swiftly injected and a timer started. Once the timer reached 6 min., one syringe containing zinc oleate (0.5 M in TOP, 50 mL) and cadmium oleate (1 M in TOP, 41 mL), and another syringe containing octanethiol (42.2 mL) were swiftly injected. Once the timer reached 40 min., the heating mantle was dropped and the reaction cooled by subjecting the vessel to a cool air flow. The final material was precipitated via the addition of butanol and methanol (4:1 ratio), centrifuged at 3000 RCF for 5 min, and the pellet redispersed into hexanes. The sample is then precipitated once more via the addition of butanol and methanol (3:1 ratio), centrifuged, and dispersed into toluene for storage (616 nm emission, 25 nm FWHM, 80% QY, and 94% EQE in film).

EXAMPLE II

Preparation of Semiconductor Nanocrystals Capable of Emitting Green Light

Synthesis of CdSe Cores:

262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle was removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor was then immediately submerged in a partially frozen (via liquid nitrogen) squalane bath rapidly reducing the temperature of the reaction to below 100° C. The first absorption peak of the nanocrystals was 487 nm. The CdSe cores were precipitated out of the growth solution inside a nitrogen atmosphere glovebox by adding a 3:1 mixture of methanol and isopropanol. The isolated cores were then dissolved in hexane and used to make core-shell materials. The isolated material specifications were as follows: Optical Density @ 350 nm=1.62; Abs=486 nm; Emission=509 nm; FWHM=38 nm; Total Volume=1.82 L of hexane.

Synthesis of CdSe/ZnS/CdZnS Core-Shell Nanocrystals:

335 mL of 1-octadecene (ODE), 12.55 g of zinc acetate, and 38 mL of oleic acid were loaded into a 1 L glass reactor and degassed at 100° C. for 1 hour. In a 1 L 3-neck flask, 100 mL of ODE was degassed at 120° C. for 1 hour. After degassing, the temperature of the flask was reduced to 65° C. and then 23.08 mmol of CdSe cores from the procedure above (275 mL) were blended into the 100 mL of degassed ODE and the hexane was removed under reduced pressure. The temperature of the reactor was then raised to 310° C. In a glove box, the core/ODE solution and 40 mL of octanethiol were added to a 180 mL container. In a 600 mL container, 151 mL of 0.5 M Zn Oleate in TOP, 37 mL of 1.0 M Cd Oleate in TOP, and 97 mL of 2 M TOP-S were added. Once the temperature of the reactor hit 310° C., the ODE/QD cores/Octanethiol mixture was injected into the reactor and allowed to react for 30 min at 300° C. After this reaction period, the Zn Oleate/Cd Oleate/TOP-S mixture was injected to the reactor and the reaction was allowed to continue for an additional 30 minutes at which point the mixture was cooled to room temperature. The resulting core-shell material was precipitated out of the growth solution inside a nitrogen atmosphere glovebox by adding a 2:1 mixture of butanol and methanol. The isolated quantum dots (QDs) were then dissolved in toluene and precipitated a second time using 2:3 butanol:methanol. The QDs were finally dispersed in toluene. The isolated material specifications were as follows: Optical Density @ 450 nm (100 Fold Dilution)=0.32; Abs=501 nm; Emission=518 nm; FWHM=38 nm; Solution QY=60%; Film EQE=93%.

EXAMPLE III

Preparation of Polymerizable Formulation Including Quantum Dots

A clean, dry Schlenk flask equipped with a magnetic stir bar and rubber septum was charged with, lauryl methacrylate (LMA) (Aldrich Chemical, 96%), dodecanediol diacrylate (D3DMA) as well as any additive(s) indicated for the particular example. If additives were used, dispersion in the monomer was assisted by placing the suspension in a sonic bath for 4 minutes and heating gently with a heat gun until no more solid will dissolve. The solution was inerted using a vacuum manifold and degassed in a standard protocol by freeze-pump-thawing the mixture three times successively using liquid nitrogen. The thawed solution is finally placed under nitrogen and labeled "monomer solution".

Separately, a clean, dry Schlenk flask equipped with a magnetic stir bar and rubber septum was charged with treated fumed silica (TS-720, Cabot Corp), titanium dioxide (R902+, DuPont Corp.) and inerted under nitrogen. To this is added toluene (dry and oxygen free). The mixture is placed in an ultrasonic bath for 10 minutes and then stirred under nitrogen. This is labeled "metal oxide slurry".

Separately, a clean, dry Schlenk flask equipped with a magnetic stir bar and rubber septum was inerted under nitrogen. The flask was then charged with a green quantum dot solution in toluene, red quantum dot solution in toluene and additional toluene via syringe and allowed to stir for 5 minutes. Over 6 minutes, the contents of the "monomer solution flask" were added via syringe and stirred for an additional five minutes. The contents of the "metal oxide slurry" flask were next added over 5 minutes via cannula and rinsed over with the aid of a minimum amount of additional toluene.

The stirred flask was then placed in a warm water bath (<60° C.), covered with aluminum foil to protect from light and placed under a vacuum to remove all of the toluene to a system pressure of <200 mtorr. After solvent removal was completed, slurry was removed from heat and, with stirring, Irgacure 2022 photoinitiator (BASF), without purification, was added via syringe and allowed to stir for 5 minutes. The final ink was then ready for transfer to a fill station.

EXAMPLE IV

Light Emission Characteristics from Quantum Dot Formulations Exposed to Air, Sparged and Degassed A quantum dot formulation using the method of Example III was prepared having the following composition: 0.5% green quantum dots, 0.2% red quantum dots, 0.2% $TiO_2$, 5.0% TOPO, 10.0% silica, 69.1% LMA, 14.0% D3MA (dodecyldimethacrylate) and 1.0% Irgacure 2022. A sample of quantum dot formulation was exposed to air for 11 days. The sample was kept in the dark to prevent any polymerization. After 11 days, about 15 ml of the sample was placed in a Schlenk flask and sparged with argon gas for 15 min. The sparging was accomplished via a needle inserted below the liquid surface that transferred argon from a source to the liquid. The gas flow rate was adjusted to impart a vigorous water boiling appearance to the liquid while sparging. A stir bar was also used to keep the liquid mixed during sparging. After 15 min, the argon flow was stopped and vacuum was applied to the liquid to completely de-gas it prior to filling it in a glass tube. The sparged and degassed quantum dot formulation was introduced into a tube with a seal at one end. The liquid was filled into the tube by completely evacuating the tube first using vacuum, then dipping the open end of the tube into the liquid, and then using pressure on the liquid surface to move it into the tube. Once the tube was filled, the second end was sealed, and the entire tube was exposed to UV light to polymerize the monomer.

Figure 2:
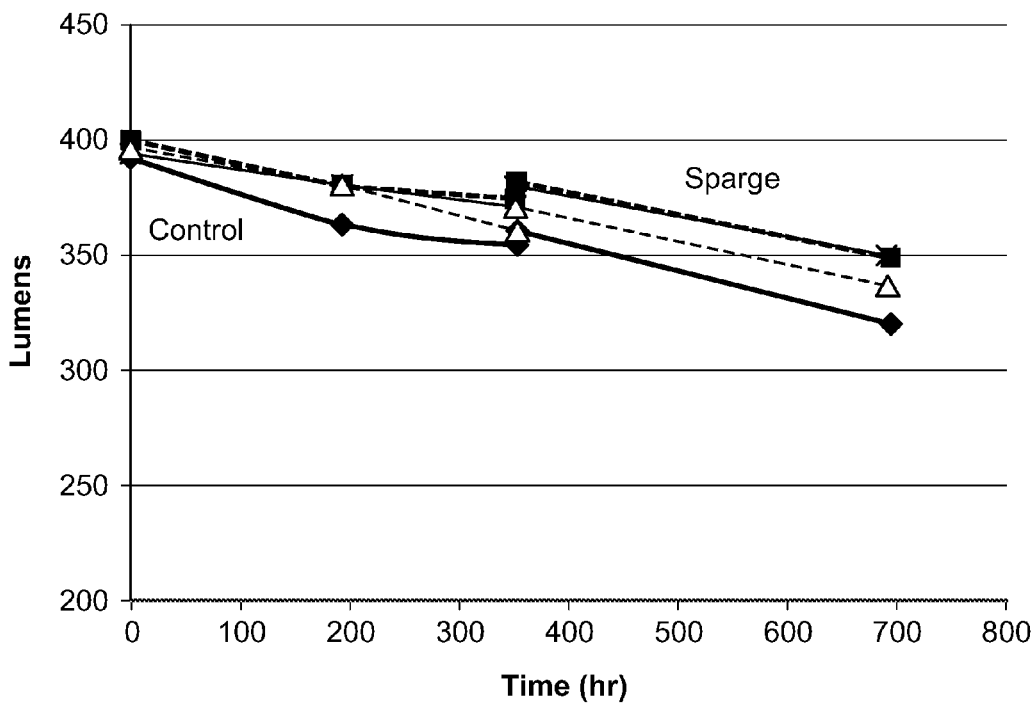
FIG. 2 is a graph of lumens over time.
Figure 3:
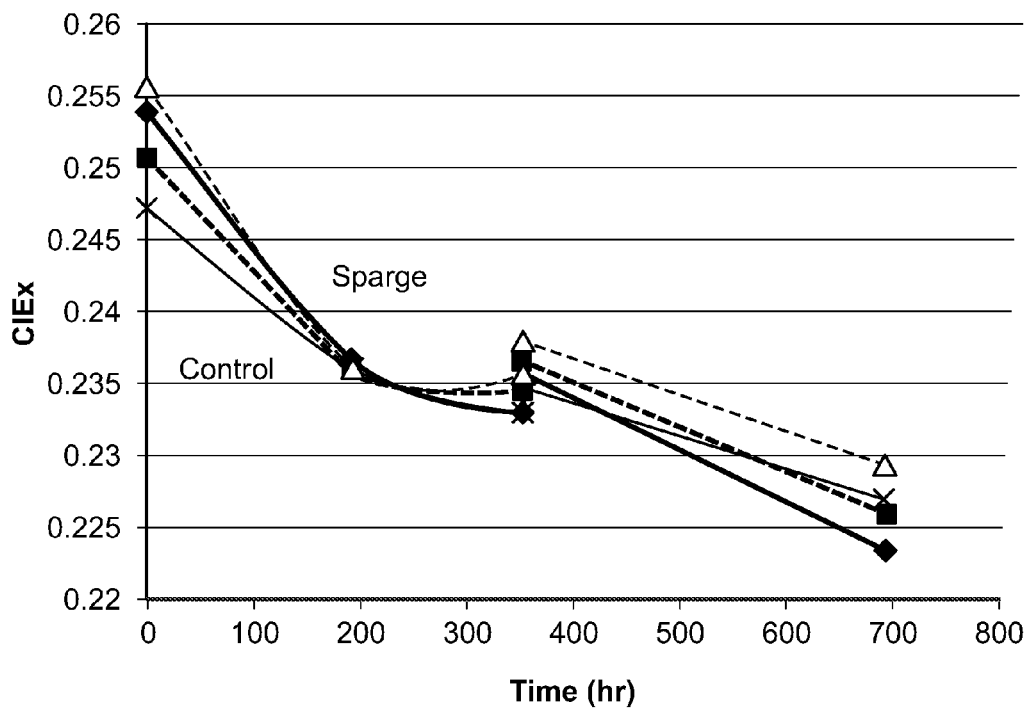
FIG. 3 is a graph of $CIE_x$ over time.
Figure 4:
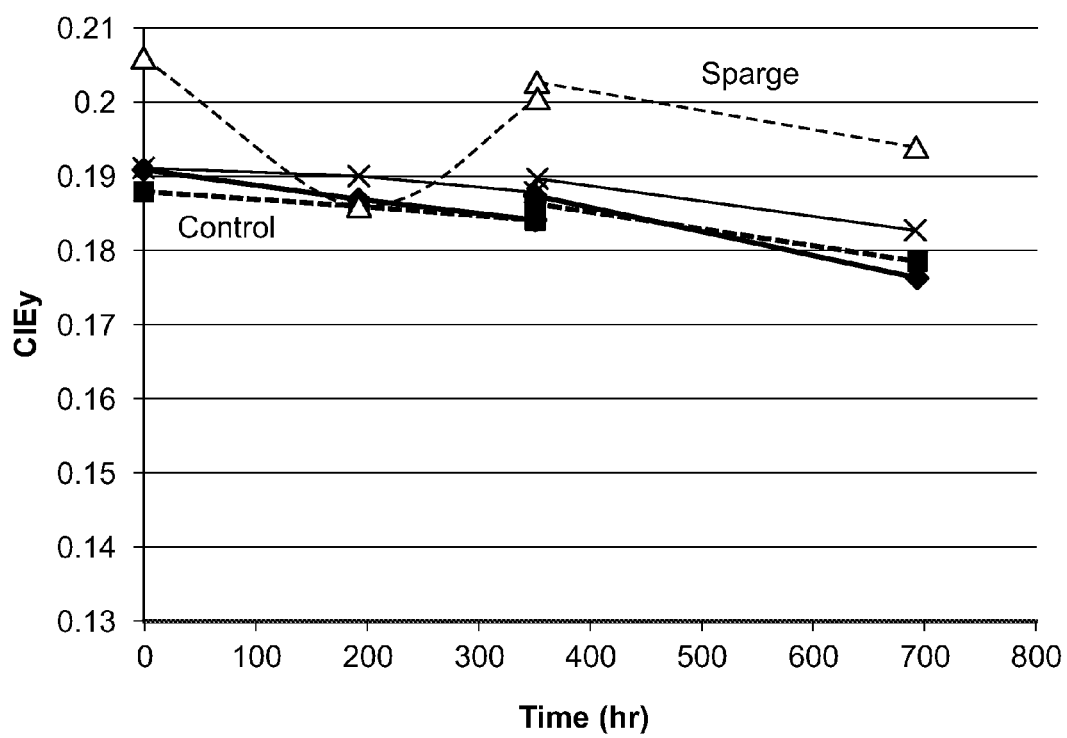
FIG. 4 is a graph of $CIE_y$ over time.

The control (t=0) sample tube was filled in a similar manner, except that the control was a quantum dot formulation of the same composition that was not exposed to air. Two control and two sparged sample tubes were then exposed to a high light flux using a 400 mW blue LED tester, which resulted in polymer temperatures of about 120° C. The performance of both capillaries was monitored with time on the tester using an inline color sensor. The performance (lumens, $CIE_x$, $CIE_y$) of both sets of samples are plotted in FIGS. 2, 3 and 4 which show that the sparged samples behaved similar to the control samples.

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method of processing a quantum dot formulation including oxygen comprising:
    providing in a reaction vessel the quantum dot formulation; where the quantum dot formulation comprises quantum dots and a liquid formulation; and the liquid formulation comprises an unpolymerized polymeriz- able component and an inhibitor compound, which requires oxygen to inhibit polymerization;

displacing the oxygen with an inert gas by sparging the quantum dot formulation with the inert gas; and degassing the quantum dot formulation in the reaction vessel.

2. The method of claim 1 wherein the inert gas is introduced into the quantum dot formulation to the extent sufficient to remove substantially all oxygen from the quantum dot formulation.

3. The method of claim 1 wherein the processed quantum dot formulation includes substantially no oxygen.

4. The method of claim 1 wherein the inert gas is nitrogen, helium, neon, argon, krypton, xenon or radon.

5. The method of claim 1 wherein the quantum dot formulation is degassed to the extent sufficient to remove substantially all gas from the quantum dot formulation.

6. The method of claim 1 wherein the degassed quantum dot formulation includes substantially no gas.

7. The method of claim 1 further comprising the step of introducing the processed quantum dot formulation into a tube where the quantum dot formulation further comprises an unpolymerized polymerizable component.

8. The method of claim 1 further comprising the step of introducing the processed quantum dot formulation into a vessel.

9. The method of claim 7 wherein the tube is a capillary.

10. The method of claim 7 wherein the tube is hermetically sealed and wherein oxygen is absent or substantially absent from within the tube.

11. The method of claim 8 wherein the vessel is hermetically sealed and wherein oxygen is absent or substantially absent from within the vessel.

12. The method of claim 7 further comprising the step of polymerizing the quantum dot formulation within the tube.

13. A method of processing a quantum dot formulation including dissolved oxygen comprising:

introducing an inert gas into the quantum dot formulation for a time period sufficient to remove substantially all oxygen from the quantum dot formulation; where the quantum dot formulation is contained in a reaction vessel, and the quantum dot formulation comprises an unpolymerized polymerizable component and an inhibitor compound, which requires oxygen to inhibit polymerization;

subjecting the quantum dot formulation to vacuum while under agitation; and degassing the quantum dot formulation to remove substantially all dissolved gas from the quantum dot formulation in the reaction vessel.

* * * * *